US009921565B2

(12) United States Patent
Ikegami

(10) Patent No.: US 9,921,565 B2
(45) Date of Patent: Mar. 20, 2018

(54) PROGRAMMING ASSIST DEVICE FOR PROGRAMMABLE LOGIC CONTROLLER PROGRAM AND PROGRAMMING ASSIST METHOD FOR THE PROGRAM

(71) Applicant: JTEKT CORPORATION, Osaka-shi (JP)

(72) Inventor: Kenichi Ikegami, Inazawa (JP)

(73) Assignee: JTEKT CORPORATION, Osaka-shi (JP)

( * ) Notice: Subject to any disclaimer, the term of this patent is extended or adjusted under 35 U.S.C. 154(b) by 424 days.

(21) Appl. No.: 14/679,362

(22) Filed: Apr. 6, 2015

(65) Prior Publication Data
US 2015/0293515 A1    Oct. 15, 2015

(30) Foreign Application Priority Data

Apr. 10, 2014    (JP) .................................. 2014-081034

(51) Int. Cl.
*G06F 9/44*    (2006.01)
*G05B 19/05*    (2006.01)
(Continued)

(52) U.S. Cl.
CPC ......... *G05B 19/056* (2013.01); *G05B 19/042* (2013.01); *G06F 8/40* (2013.01); *G05B 2219/13004* (2013.01)

(58) Field of Classification Search
CPC .............................................. G06F 8/40–8/41
(Continued)

(56) References Cited

U.S. PATENT DOCUMENTS 6,334,076 B1 *  12/2001  Sakurai .................. G05B 15/02
                                                            700/18
6,411,858 B1 *   6/2002  Sakurai .................. G05B 15/02
                                                            700/17
(Continued)

FOREIGN PATENT DOCUMENTS

EP    2 151 753 A1    2/2010
JP    09-212212 A     8/1997
JP    2006-235660 A   9/2006

OTHER PUBLICATIONS

ResearchGate-Verification of PLC Program using a Generic Intermediate Language (IML)—Devinder Thapa, Suraj Dangol, Chang Mok Park, and Gi-Nam Wang-Industrial & Information System Engineering Department, AJOU University Kyonggi Do, Paldal Gu, Suwon, South Korea—Jan. 2006.*

(Continued)

*Primary Examiner* — Francisco Aponte
(74) *Attorney, Agent, or Firm* — Oblon, McClelland, Maier & Neustadt, L.L.P.

(57) ABSTRACT

A programming assist device for a PLC program and a programming assist method for a PLC program capable of easily preparing separate executable files for causing redundant CPUs of a PLC to operate and reliably preventing an emergency stop of the PLC due to a failure in converter software are provided. First and second intermediate codes are generated from an original program. An inverse conversion program is generated from the first intermediate code. A reconverted first intermediate code and a reconverted second intermediate code are generated from the inverse conversion program. In the case where the intermediate codes and the reconverted intermediate codes match each other, a first executable file is generated from the reconverted first intermediate code, and a second executable file (Continued)

is generated from the reconverted second intermediate code. The executable files are transferred to the PLC.

9 Claims, 6 Drawing Sheets

(51) Int. Cl.
*G06F 9/45* (2006.01)
*G05B 19/042* (2006.01)

(58) Field of Classification Search
USPC ........................................................ 717/106
See application file for complete search history.

(56) References Cited

U.S. PATENT DOCUMENTS

| | | | | |
|---|---|---|---|---|
| 6,654,953 | B1 * | 11/2003 | Beaumont | G06F 8/423 717/112 |
| 7,543,015 | B2 * | 6/2009 | Vion-Dury | G06F 8/31 707/999.006 |
| 7,913,224 | B2 * | 3/2011 | Nissen | G06F 8/34 717/106 |
| 8,327,316 | B2 * | 12/2012 | Chouinard | G05B 19/056 717/100 |
| 9,235,381 | B2 * | 1/2016 | Frohberger | G05B 19/056 |
| 9,411,920 | B2 * | 8/2016 | Blasig | G06F 8/34 |
| 9,619,212 | B2 * | 4/2017 | Fige | G06F 8/35 |
| 2006/0101425 | A1 * | 5/2006 | Donovan | G06F 8/443 717/136 |
| 2006/0190851 | A1 * | 8/2006 | Karaki | G06F 17/5059 716/103 |
| 2008/0163182 | A1 * | 7/2008 | Breault | G06F 11/004 717/146 |
| 2010/0083223 | A1 * | 4/2010 | Chouinard | G05B 19/056 717/110 |
| 2010/0180267 | A1 * | 7/2010 | Huang | G05B 19/056 717/140 |
| 2011/0131548 | A1 * | 6/2011 | Colton | G06F 8/52 717/106 |
| 2011/0252410 | A1 * | 10/2011 | Heishi | G06F 8/314 717/146 |
| 2014/0282369 | A1 * | 9/2014 | Pressley | G06F 8/35 717/105 |
| 2014/0289698 | A1 * | 9/2014 | Tanguy | G06F 8/35 717/104 |

OTHER PUBLICATIONS

Extended Search Report dated Oct. 27, 2015 in European Patent Application No. 15162951.6.

* cited by examiner

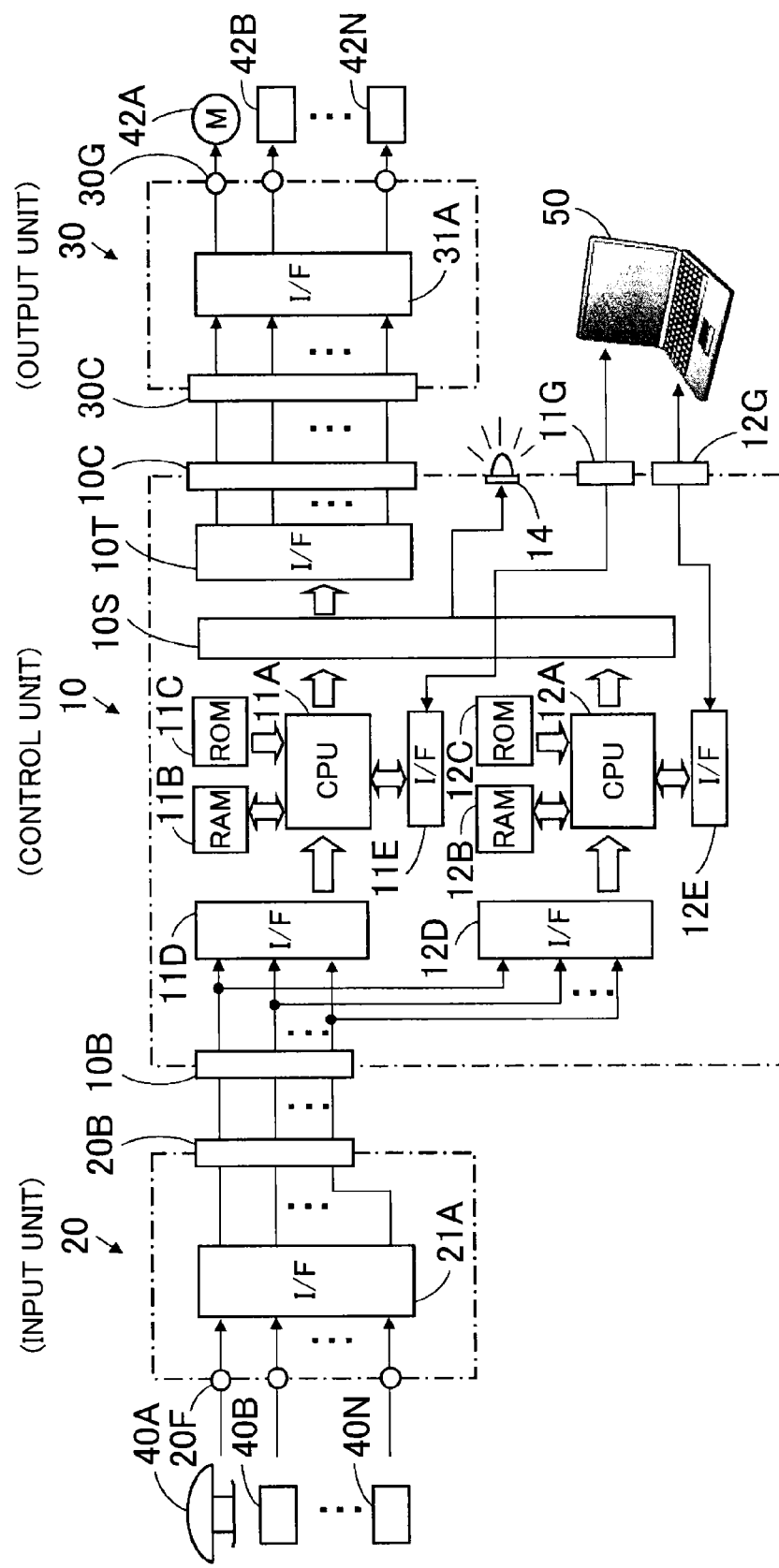

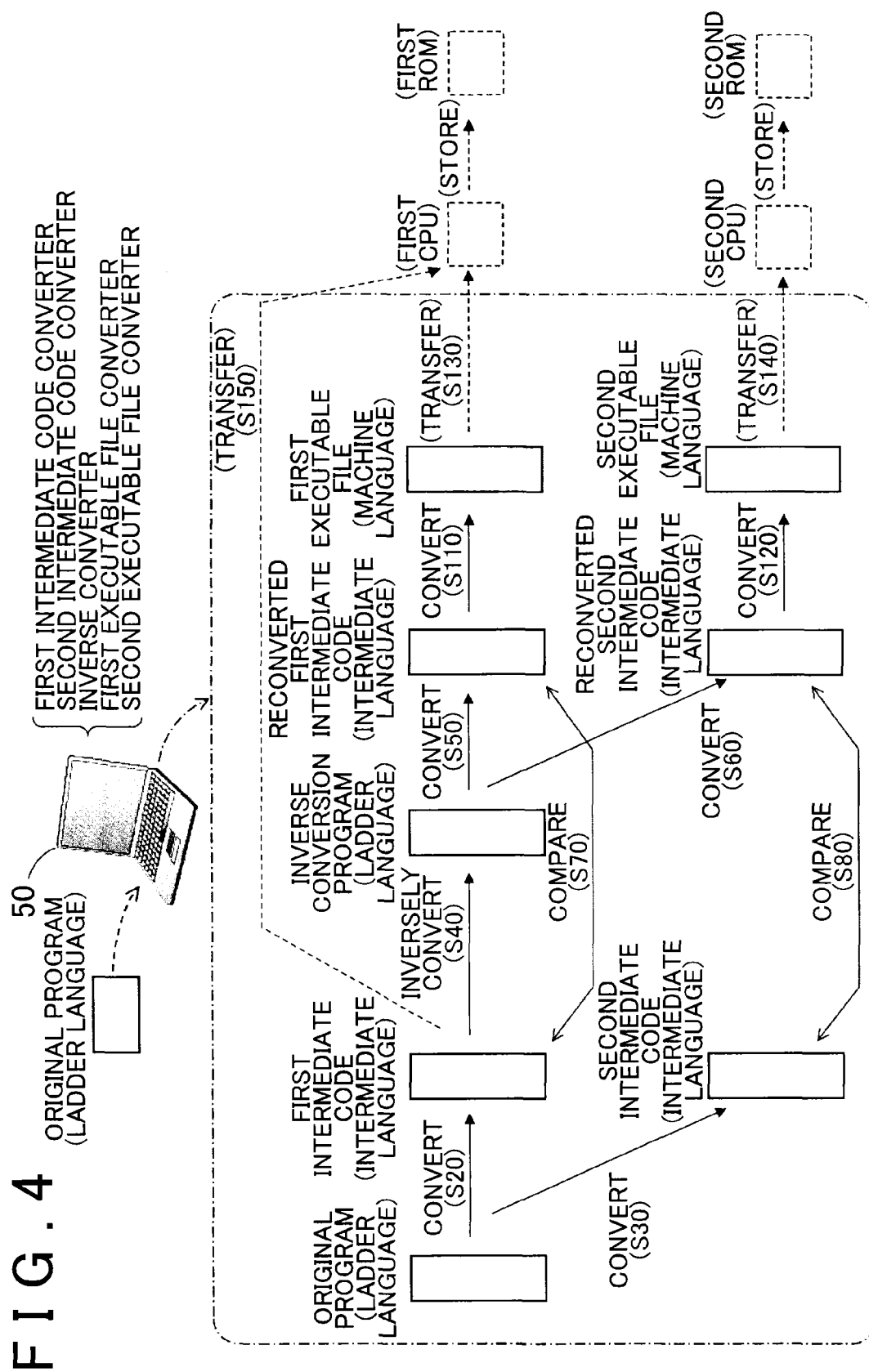

PROGRAMMING ASSIST DEVICE FOR PROGRAMMABLE LOGIC CONTROLLER PROGRAM AND PROGRAMMING ASSIST METHOD FOR THE PROGRAM

INCORPORATION BY REFERENCE

The disclosure of Japanese Patent Application No. 2014-081034 filed on Apr. 10, 2014 including the specification, drawings and abstract, is incorporated herein by reference in its entirety.

BACKGROUND OF THE INVENTION

1. Field of the Invention

The present invention relates to a programming assist device for a programmable logic controller program and a programming assist method for a programmable logic controller program.

2. Description of the Related Art

A programmable logic controller (hereinafter referred to as "PLC") is used to control automated machinery in a factory or the like. The PLC includes a central processing unit (hereinafter referred to as "CPU") that is a small computer and that executes a program. A ladder language that describes sequence control in the form of a ladder circuit is used to prepare the program. The ladder language may be rewritten as appropriate into a sequence program that matches the usage. The PLC receives a signal (on or off information) about a continuous state input from a variety of input devices (such as switches and sensors). The PLC controls (e.g. outputs an on or off signal to) output devices (such as relays and motors) using the sequence program in which the variety of input devices are combined in a desired form (connected in series or in parallel).

PLCs called safety PLCs are provided with redundant CPUs and ROMs. The two ROMs are loaded with separate executable files (codes, namely programs, written in a machine language that is executable by the PLCs) prepared from an identical ladder language program. In the case where outputs from the redundant CPUs match each other, the outputs are used to control output devices such as motors and relays. That is, two different executable files prepared from an identical ladder language program are executed by separate CPUs, and outputs from the CPUs are collated with each other to prevent occurrence of an emergency stop in the case where there is any unexpected failure in software for conversion from the ladder language program to the executable files or the like.

In the related art, in preparing separate executable files, an intermediate code converter (converter software) is used to convert the ladder language program into an intermediate code (a program written in an intermediate language), and the intermediate code is verified by a designer sentence by sentence to check the presence or absence of any failure in conversion. The intermediate code is then converted into a first executable file by a first executable file converter (converter software), and into a second executable file by a second executable file. The first executable file is loaded into a first CPU, and the second executable file is loaded into a second CPU.

Japanese Patent Application Publication No. 2006-235660 (JP 2006-235660 A) discloses a control system in which a numerical data program rather than executable files is transferred to a PLC and the PLC includes an interpreter program that interprets the numerical data program command by command to execute the numerical data program. In the configuration, the PLC does not directly execute the numerical data program, but executes the content of an interpretation (a translation into a machine language) by the interpreter program.

Japanese Patent Application Publication No. 9-212212 discloses a collation method for a sequence circuit capable of recognizing a contradiction in logic or an overlap in logic by extracting sequences A and B from a ladder sequence 3 prepared by synthesizing a standard ladder sequence 1 for equipment 1E and a standard ladder sequence 2 for equipment 2E, for example, mnemonically developing the sequences A and B for each block (into a combination of English words and symbols translated from a machine language in such a manner that is easily understandable and describable by humans), logically expressing the developed sequences, sorting the sequences in the order of their addresses, and comparing the sequences with each other.

In the method according to the related art in which a ladder language program is converted into an intermediate code and a first executable file and a second executable file are prepared from the intermediate code resulting from the conversion, it takes significantly much time and effort for a designer to verify the intermediate code resulting from the conversion from the ladder language program sentence by sentence, which is not preferable. In addition, although two types of executable file converter are prepared to prepare separate executable files from one intermediate code, only one type of conversion from the ladder language program into an intermediate code is used. Thus, in the case where there is any failure in an intermediate code converter (converter software) that converts the ladder language program into an intermediate code, the failure may not be discovered even if the designer verifies the intermediate code sentence by sentence, and an emergency stop of a PLC due to an error in executable files may be caused, which is not preferable.

As opposed to the method described above, it is also conceivable to prepare two types of intermediate code converter (converter software) to prepare separate intermediate codes from one ladder language program, and to prepare separate executable files from the two types of intermediate code using two types of executable file converters (converter software). In order to maintain the series of programs, however, it is necessary to save the ladder language program, which requires a large storage capacity and thus is not preferable (a ladder language program has a significantly large size compared to intermediate codes and executable files). Alternatively, the two types of intermediate code may be saved instead of saving the ladder language program. However, saving the two types of intermediate code requires an extra storage capacity (compared to a case where one type of intermediate code is saved), which is not preferable.

Meanwhile, the control system described in JP 2006-235660 A addresses a special PLC loaded with an interpreter program, and operates slower than a PLC that is loaded with an executable file in a machine language and directly operates on the machine language. In the case where the redundant CPUs of the safety PLC are loaded with an interpreter program and different numerical data programs, the difference in operating time since interpretation until execution of the numerical data programs may be large, which is not preferable.

The collation method for a sequence circuit described in JP 9-212212 A may not be applied as a method in which the redundant CPUs of the safety PLC are loaded with separate executable files.

SUMMARY OF THE INVENTION

It is an object of the present invention to provide a programming assist device for a programmable logic controller program and a programming assist method for a programmable logic controller program capable of effortlessly preparing separate executable files for causing redundant CPUs of a PLC to operate, reliably preventing an emergency stop of the PLC due to a failure in converter software, and reducing the storage capacity for maintenance of a program.

According to an aspect of the present invention, a programming assist device for a programmable logic controller program, includes:

a first intermediate code converter and a second intermediate code converter that are different from each other and that each generate an intermediate code written in a second predetermined language from a program written in a first predetermined language;

an inverse converter that generates a program written in the first predetermined language obtained through an inverse conversion from the intermediate code written in the second predetermined language;

a first executable file converter and a second executable file converter that are different from each other and that each generate an executable file that is executable by a programmable logic controller from the intermediate code written in the second predetermined language;

an intermediate code generation device that generates a first intermediate code from an original program written in the first predetermined language using the first intermediate code converter and that generates a second intermediate code, which is different from the first intermediate code, from the original program, which is used to generate the first intermediate code, using the second intermediate code converter;

an inverse conversion program generation device that generates an inverse conversion program obtained through an inverse conversion from the first intermediate code using the inverse converter;

a reconverted intermediate code generation device that generates a reconverted first intermediate code from the inverse conversion program using the first intermediate code converter and that generates a reconverted second intermediate code, which is different from the reconverted first intermediate code, from the inverse conversion program using the second intermediate code converter;

an intermediate code collation device that compares the first intermediate code and the reconverted first intermediate code with each other or compares the second intermediate code and the reconverted second intermediate code with each other;

an executable file generation device that generates a first executable file from the reconverted first intermediate code using the first executable file converter and that generates a second executable file, which is different from the first executable file, from the reconverted second intermediate code using the second executable file converter in the case where the codes match each other in the comparison performed by the intermediate code collation device; and a file transfer device that, in a programmable logic controller that includes redundant control devices and storage devices composed of a first control device and a first storage device and a second control device and a second storage device, transfers the first executable file to the first control device to store the first executable file in the first storage device and transfers the second executable file to the second control device to store the second executable file in the second storage device.

According to the aspect described above, two types of intermediate code are generated by two different types of intermediate code converter (converter software) from the inverse conversion program generated using the inverse converter and written in the first predetermined language, and thereafter two types of executable file are generated by two different types of executable file converter (converter software). Consequently, it is possible to appropriately stop an output from the PLC in the case where there is any failure in the converter software. Thus, it is possible to reliably prevent an emergency stop of the PLC. In addition, even in the case where there is any failure in the inverse converter (converter software), the failure can be discovered by the collation of the intermediate codes. In addition, it is possible to significantly reduce time and effort by eliminating work in which a designer verifies an intermediate code sentence by sentence.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 illustrates an example of the block configuration of the PLC composed of the control unit, the input unit, and the output unit and the connection of the PLC with a programming assist device for a PLC program;

FIG. 4 illustrates the procedure for the programming assist device for a PLC program to generate programs etc. in processes illustrated in FIG. 3A TO 3C.

DETAILED DESCRIPTION OF EMBODIMENTS

An embodiment of the present invention will be described below with reference to the drawings.

Figure 1:
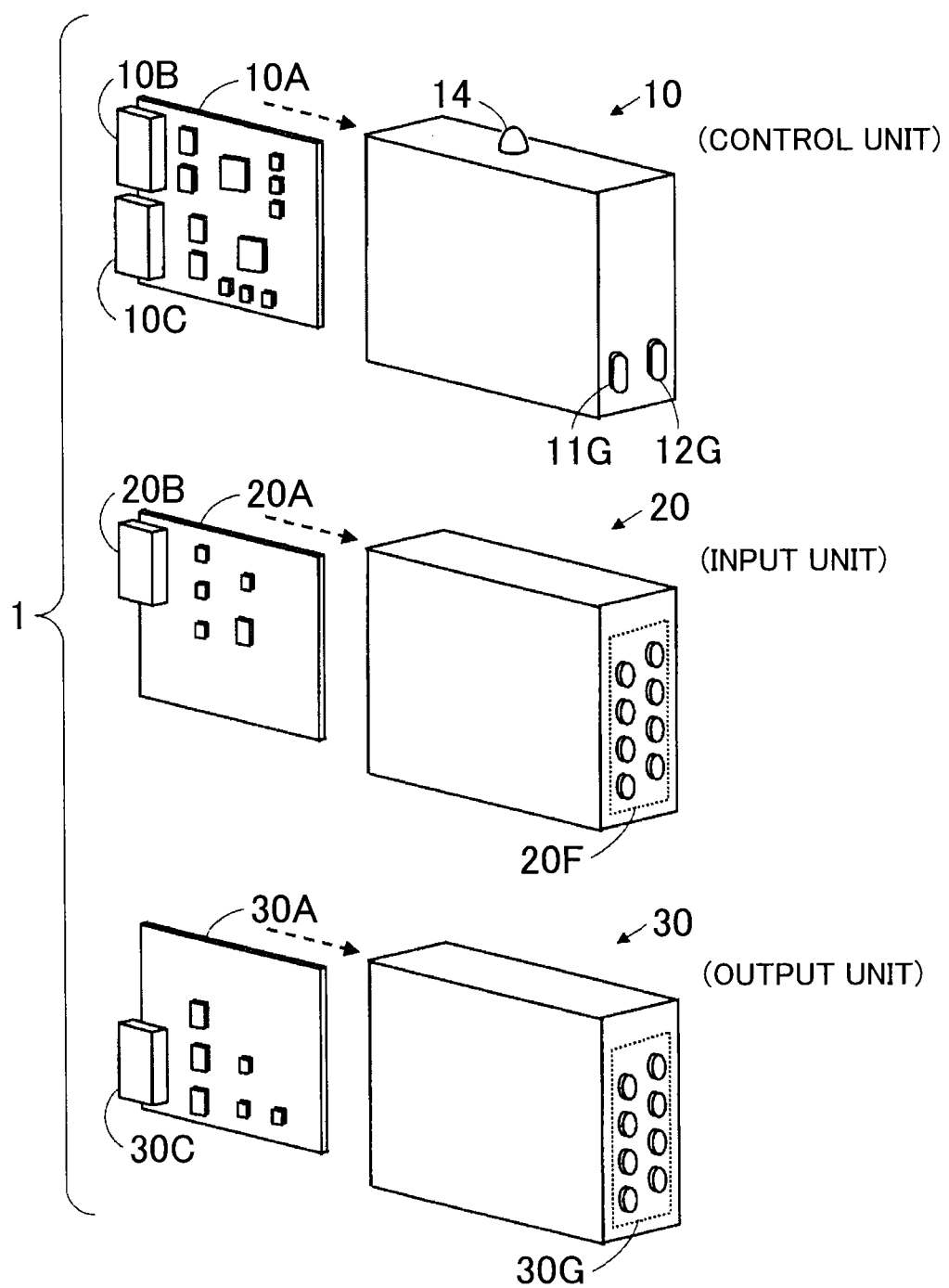
FIG. 1 is a perspective view illustrating the appearance of a control unit, an input unit, and an output unit that compose a PLC.

As illustrated in FIG. 1, a PLC 1 is composed of a control unit 10, an input unit 20, and an output unit 30. The number of input units 20 and output units 30 may be increased as appropriate in accordance with the number of inputs and outputs. An input board 20A that includes a connector 20B for connection with the control unit 10 is housed in the input unit 20. The input unit 20 is provided with an input terminal 20F for connection with wiring that extends from a plurality of input devices (such as sensors and switches). An output board 30A that includes a connector 30C for connection with the control unit 10 is housed in the output unit 30. The output unit 30 is provided with an output terminal 30G for connection with wiring that extends to a plurality of output devices (such as relays and motors). A control board 10A that includes a connector 10B for connection with the input unit 20 and a connector 10C for connection with the output unit 30 is housed in the control unit 10. The control unit 10 is provided with connectors 11G, 12G, and so forth for connection with a programming assist device for a PLC program such as a personal computer. In addition, the control unit 10 is provided with an alarm device 14 that announces occurrence of an abnormality, for example.

Next, an example of the block configuration and the connection of the PLC 1 will be described with reference to FIG. 2. Wiring that extends from a plurality of input devices (such as a switch 40A, a sensor 40B through an input apparatus 40N) is connected to the input terminal 20F of the input unit 20. A signal (such as on or off information) about a continuous state of the plurality of input devices is input to the input terminal 20F. The input signal about the continuous state is transferred to the control unit 10 via an interface 21A (hereinafter, the term "interface" will be referred to as "I/F") and the connector 20B.

The PLC 1 (e.g. a safety PLC) described in relation to the embodiment has redundant control devices and storage devices. That is, the control unit 10 includes a first control device and a first storage device composed of a first CPU 11A (corresponding to the first control device) and a first RAM 11B and a first ROM 11C (corresponding to the first storage device), respectively, and a second control device and a second storage device composed of a second CPU 12A (corresponding to the second control device) and a second RAM 12B and a second ROM 12C (corresponding to the second storage device), respectively. A rewritable ROM such as an EEPROM or a flash ROM is used as the first ROM 11C and the second ROM 12C. The ROMs store an executable file which is a program to be executed by the CPUs.

A user can use a programming assist device 50 for a PLC program such as a personal computer (hereinafter, the programming assist device 50 for a PLC program will be abbreviated as "PC 50") to prepare a program (such as a source code) prepared by the user himself/herself using a ladder language or the like. In the following, the program prepared by the user himself/herself will be called "original program". The user uses the PC 50 to generate two different types of executable file (native code) from an identical ladder language program, and stores a first executable file in the first ROM 11C and stores a second executable file in the second ROM 12C. The first ROM 11C also stores a program for communication with the PC 50 via an I/F 11E and the connector 11G etc. The second ROM 12C also stores a program for communication with the PC 50 via an I/F 12E and the connector 12G etc.

The first CPU 11A outputs a computation result based on the first executable file stored in the first ROM 11C and the signal about the continuous state from the input devices input from the input unit 20 via the connector 10B and an I/F 11D to a collation device 10S. In addition, the second CPU 12A outputs a computation result based on the second executable file stored in the second ROM 12C and the signal about the continuous state from the input devices input from the input unit 20 via the connector 10B and an I/F 12D to the collation device 10S. The collation device 10S is a collation circuit, for example. In the case where an output from the first CPU 11A and an output from the second CPU 12A match each other, the collation device 10S outputs the matching output to the output unit 30 via an I/F 10T and the connector 10C. In the case where an output from the first CPU 11A and an output from the second CPU 12A do not match each other, the collation device 10S does not make any output to the I/F 10T, and activates the alarm device 14 (such as an LED or a buzzer) to announce occurrence of an abnormality.

Wiring that extends to a plurality of output devices (such as a motor 42A, a relay 42B through an output apparatus 42N) is connected to the output terminal 30G of the output unit 30. The output unit 30 outputs a computation result obtained by the control unit 10 to the output devices connected to the output terminal 30G via the connector 30C and an I/F 31A.

Figure 3A:
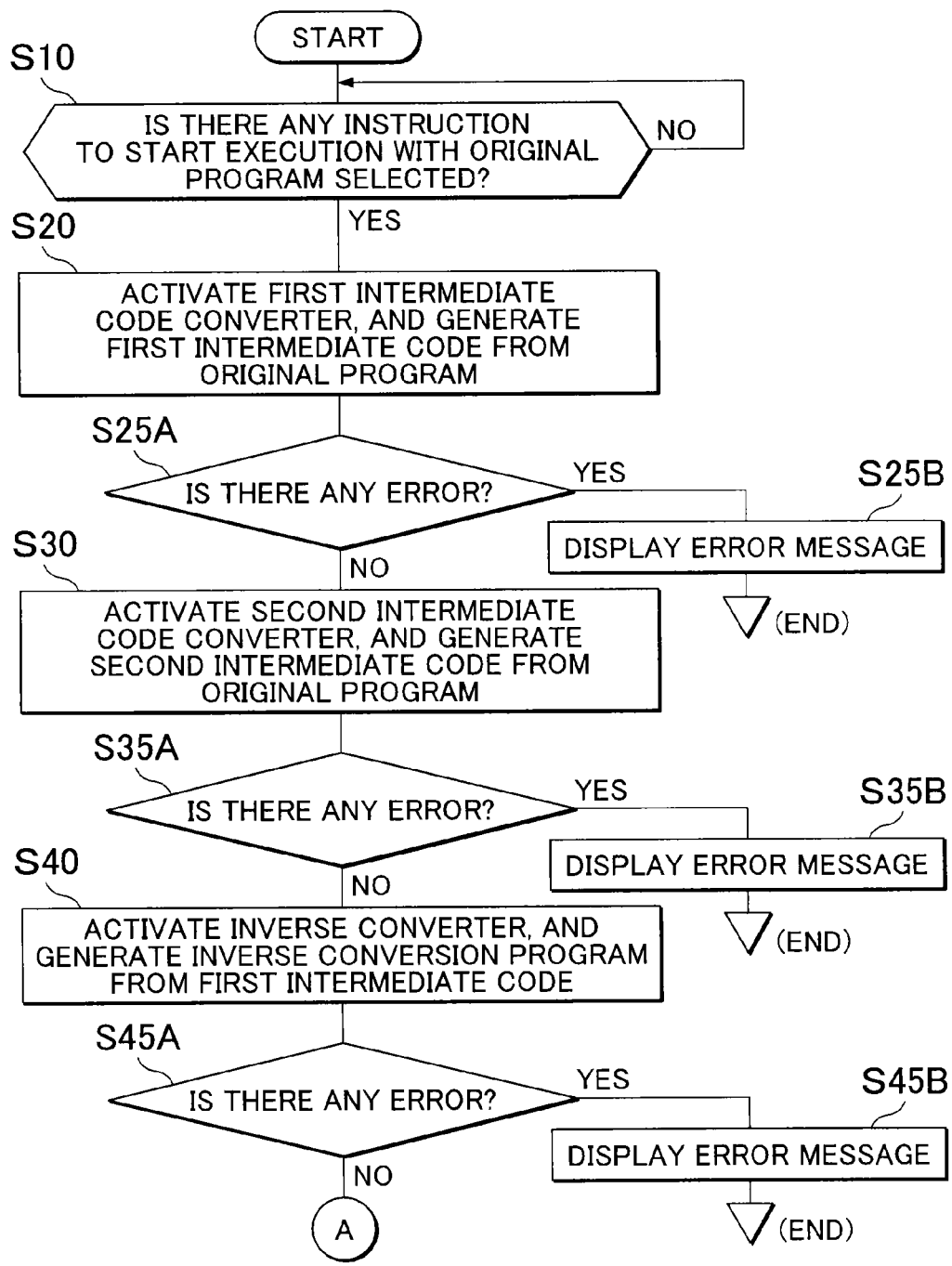
FIG. 3A is a flowchart illustrating the procedure of a process performed by the programming assist device for a PLC program.
Figure 3B:
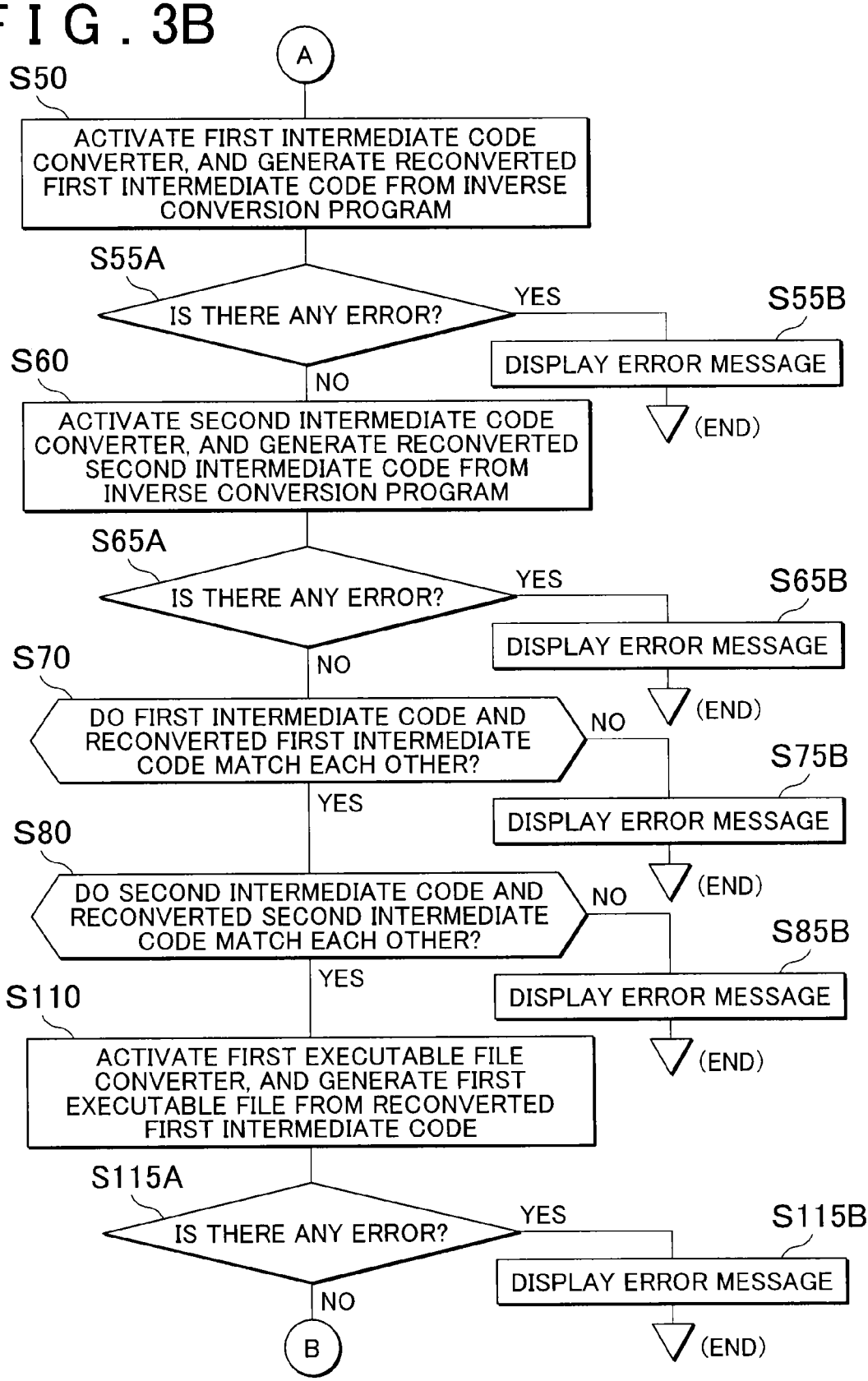
FIG. 3B is a flowchart illustrating the procedure of a process performed by the programming assist device for a PLC program.
Figure 3C:
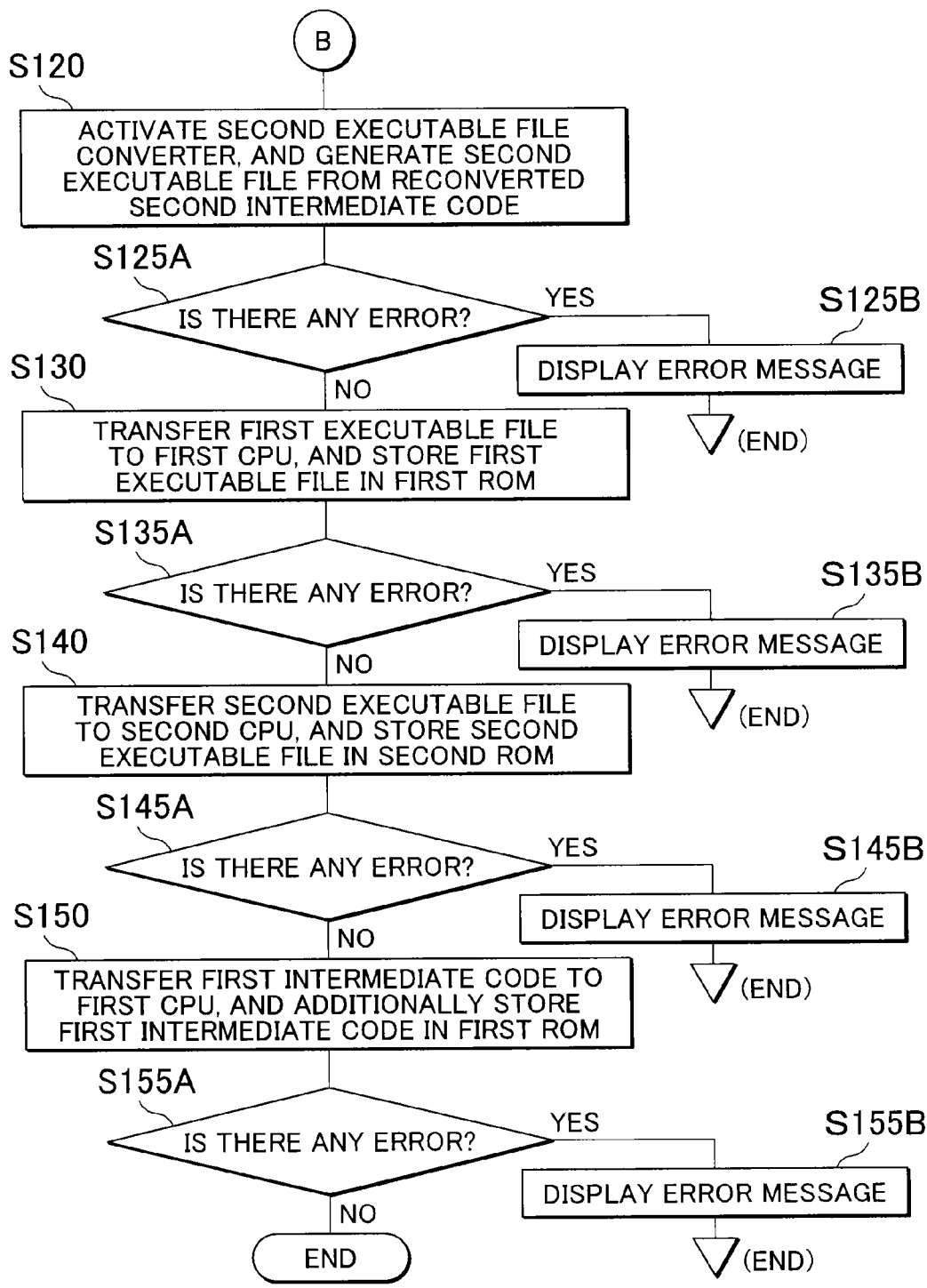
FIG. 3C is a flowchart illustrating the procedure of a process performed by the programming assist device for a PLC program.

Next, the procedure of a process for assisting preparation of a PLC program performed by the PC 50 (a programming assist device for a PLC program) (see FIG. 3A TO 3C) and programs etc. generated in each process (see FIG. 4) will be described with reference to FIGS. 3 and 4. The user uses the PC 50, another personal computer, or the like to prepare an original program, from which executable files to be loaded into the PLC 1 are prepared, and have the prepared original program stored in the PC 50. In the description of the embodiment, the original program is written in a ladder language for sequence control.

An intermediate code converter (converter software) is installed in the PC 50. The intermediate code converter generates an intermediate code written in an intermediate language (corresponding to the second predetermined language) from a program (so-called source code) written in the ladder language (corresponding to the first predetermined language). The intermediate language is a language obtained by converting the ladder language into a text format. The same intermediate language is applicable to different types of control device (CPU). In addition, a first intermediate code converter and a second intermediate code converter with different code generation procedures are installed (stored) in the PC 50. Further, an inverse converter (converter software) that generates a program (a program written in the ladder language) obtained through an inverse conversion from the intermediate code written in the intermediate language is installed in the PC 50. Moreover, an executable file converter (converter software) that generates an executable file (a native code such as a machine language) that is executable by the PLC from the intermediate code program written in the intermediate language is installed in the PC 50. A first executable file converter and a second executable file converter that are different from each other are installed in the PC 50. In the following, the procedure of a process in which a PLC program is prepared using the PC 50 in which the converter software described above is installed will be described with reference to FIG. 3A TO 3C, and programs etc. generated in each process will be described with reference to FIG. 4.

In step S10, the PC 50 determines whether or not an instruction to start execution is input with the original program (a source code written in the ladder language) selected. In the case where an instruction to start execution is input with the original program selected (Yes), the process proceeds to step S20. Otherwise (No), the process returns to step S10.

In the case where the process proceeds to step S20, the PC 50 activates the first intermediate code converter, and generates a first intermediate code from the original program (see FIG. 4). The process proceeds to step S25A. In step S25A, the PC 50 determines whether or not there is any error during generation by the first intermediate code converter. In the case where there is not any error (No), the process proceeds to step S30. In the case where there is any error (Yes), the process proceeds to step S25B. An error message is displayed, and the process is ended. In the case where the process proceeds to step S30, the PC 50 activates the second intermediate code converter, and generates a second intermediate code from the original program (see FIG. 4). The process proceeds to step S35A. In step S35A, the PC 50 determines whether or not there is any error during generation by the second intermediate code converter. In the case where there is not any error (No), the process proceeds to step S40. In the case where there is any error (Yes), the process proceeds to step S35B. An error message is displayed, and the process is ended. The processes in steps S20 and S30 correspond to step (a) (the intermediate code generation). The PC 50 during execution of the processes in steps S20 and S30 corresponds to the intermediate code generation device.

In the case where the process proceeds to step S40, the PC 50 activates the inverse converter, and generates an inverse conversion program (ladder language) from the first intermediate code (a program written in the intermediate language) generated in step S20 (see FIG. 4). The process proceeds to step S45A. In step S45A, the PC 50 determines whether or not there is any error during generation by the inverse converter. In the case where there is not any error (No), the process proceeds to step S50. In the case where there is any error (Yes), the process proceeds to step S45B. An error message is displayed, and the process is ended. The process in step S40 corresponds to step (b) (the inverse conversion program generation). The PC 50 during execution of the process in step S40 corresponds to the inverse conversion program generation device.

In the case where the process proceeds to step S50, the PC 50 activates the first intermediate code converter, and generates a reconverted first intermediate code (intermediate language) from the inverse conversion program (ladder language) generated in step S40 (see FIG. 4). The process proceeds to step S55A. In step S55A, the PC 50 determines whether or not there is any error during generation by the first intermediate code converter. In the case where there is not any error (No), the process proceeds to step S60. In the case where there is any error (Yes), the process proceeds to step S55B. An error message is displayed, and the process is ended. In the case where the process proceeds to step S60, the PC 50 activates the second intermediate code converter, and generates a reconverted second intermediate code (intermediate language) from the inverse conversion program (ladder language) generated in step S40 (see FIG. 4). The process proceeds to step S65A. In step S65A, the PC 50 determines whether or not there is any error during generation by the second intermediate code converter. In the case where there is not any error (No), the process proceeds to step S70. In the case where there is any error (Yes), the process proceeds to step S65B. An error message is displayed, and the process is ended. The processes in steps S50 and S60 correspond to step (c) (the reconverted intermediate code generation). The PC 50 during execution of the processes in steps S50 and S60 corresponds to the reconverted intermediate code generation device.

In the case where the process proceeds to step S70, the PC 50 compares the first intermediate code generated in step S20 and the reconverted first intermediate code generated in step S50 with each other (see FIG. 4). In the case where the codes match each other (Yes), the process proceeds to step S80. In the case where the codes do not match each other (No), the process proceeds to step S75B. An error message is displayed, and the process is ended. In the case where the process proceeds to step S80, the PC 50 compares the second intermediate code generated in step S30 and the reconverted second intermediate code generated in step S60 with each other (see FIG. 4). In the case where the codes match each other (Yes), the process proceeds to step S110. In the case where the codes do not match each other (No), the process proceeds to step S85B. An error message is displayed, and the process is ended. The processes in steps S70 and S80 correspond to step (d) (the intermediate code collation). The PC 50 during execution of the processes in steps S70 and S80 corresponds to the intermediate code collation device. In the process illustrated in FIG. 3A TO 3C, step (e) (the executable file generation) to be discussed later is executed in the case where the first intermediate code and the reconverted first intermediate code match each other and the second intermediate code and the reconverted second intermediate code match each other. However, step (e) to be discussed later may be executed in the case where the first intermediate code and the reconverted first intermediate code match each other or the second intermediate code and the reconverted second intermediate code match each other. That is, one of steps S70 and S80 may be omitted.

In the case where the process proceeds to step S110, the PC 50 activates the first executable file converter, and generates a first executable file (machine language) from the reconverted first intermediate code (intermediate language) generated in step S50 (see FIG. 4). The process proceeds to step S115A. In step S115A, the PC 50 determines whether or not there is any error during generation by the first executable file converter. In the case where there is not any error (No), the process proceeds to step S120. In the case where there is any error (Yes), the process proceeds to step S115B. An error message is displayed, and the process is ended. In the case where the process proceeds to step S120, the PC 50 activates the second executable file converter, and generates a second executable file (machine language) from the reconverted second intermediate code (intermediate language) generated in step S60 (see FIG. 4). The process proceeds to step S125A. In step S125A, the PC 50 determines whether or not there is any error during generation by the second executable file converter. In the case where there is not any error (No), the process proceeds to step S130. In the case where there is any error (Yes), the process proceeds to step S125B. An error message is displayed, and the process is ended. The processes in steps S110 and S120 correspond to step (e). The PC 50 during execution of the processes in steps S110 and S120 corresponds to the executable file generation device.

In the case where the process proceeds to step S130, the PC 50 transfers the first executable file generated in step S110 to the first CPU 11A via the connector 11G and the I/F 11E (see FIG. 4), and stores the first executable file in the first ROM 11C (see FIG. 2). The process proceeds to step S135A. In step S135A, the PC 50 determines whether or not there is any error during transfer of the first executable file etc. In the case where there is not any error (No), the process proceeds to step S140. In the case where there is any error (Yes), the process proceeds to step S135B. An error message is displayed, and the process is ended. In the case where the process proceeds to step S140, the PC 50 transfers the second executable file generated in step S120 to the second CPU 12A via the connector 12G and the I/F 12E (see FIG. 4), and stores the second executable file in the second ROM 12C (see FIG. 2). The process proceeds to step S145A. In step S145A, the PC 50 determines whether or not there is any error during transfer of the second executable file etc. In the case where there is not any error (No), the process proceeds to step S150. In the case where there is any error (Yes), the process proceeds to step S145B. An error message is displayed, and the process is ended. The processes in steps S130 and S140 correspond to step (f) (the file transfer). The PC 50 during execution of the processes in steps S130 and S140 corresponds to the file transfer device.

In the case where the process proceeds to step S150, the PC 50 transfers the first intermediate code generated in step S20 to the first CPU 11A via the connector 11G and the I/F 11E (see FIG. 4), and stores the first intermediate code in the first ROM 11C (see FIG. 2). The process proceeds to step S155A. In step S155A, the PC 50 determines whether or not there is any error during transfer of the first intermediate code etc. In the case where there is not any error (No), the process is ended. In the case where there is any error (Yes), the process proceeds to step S155B. An error message is displayed, and the process is ended. Step S150 may be included in the file transfer S130. The processes in steps S150 to S155B may be omitted.

The step in which the first intermediate code is stored in the first ROM 11C corresponds to saving of a program for maintenance. If the first intermediate code is left, the inverse conversion program, the reconverted first intermediate code, the reconverted second intermediate code, the first executable file, and the second executable file can be easily generated by the relevant converter software. Thus, it is not necessary to store the original program and the inverse conversion program written in the ladder language. In this case, the size of the intermediate code in the intermediate language is about one-sixteenth the size of the program in the ladder language. Accordingly, the storage capacity can be significantly reduced. In addition, it is not necessary to store two types of intermediate code, namely the first intermediate code and the second intermediate code, and it is only necessary to store the first intermediate code.

In the programming assist method for a PLC program described in relation to the embodiment, two different types of intermediate code are generated from an original program in a first predetermined language using two types of intermediate code converter (converter software) with different code generation procedures, and two types of executable file are generated from the two different types of intermediate code using two types of executable file converter (converter software) with different code generation procedures. Consequently, it is possible to appropriately stop an output from the PLC in the case where there is any failure in the converter software. Thus, it is possible to reliably prevent an emergency stop of the PLC due to an error in executable files. In addition, it is possible to reduce time and effort by eliminating intermediate code verification work according to the related art in which a designer verifies an intermediate code sentence by sentence by comparing the first intermediate code and the reconverted first intermediate code with each other in step S70 and comparing the second intermediate code and the reconverted second intermediate code with each other in step S80. In addition, even in the case where there is any failure in inverse converter (converter software) in step (d), the failure can be discovered appropriately.

In addition, it is possible to relatively easily implement a programming assist device (PC 50) for a PLC program that includes:

a storage device that stores the first intermediate code converter, the second intermediate code converter, the inverse converter, the first executable file converter, and the second executable file converter; and a control device that executes steps (a) to (f) through execution by the first intermediate code converter, the second intermediate code converter, the inverse converter, the first executable file converter, and the second executable file converter to.

The programming assist device for a programmable logic controller program and the programming assist method for a programmable logic controller program according to the present invention are not limited to the process procedure, the configuration, the appearance, and so forth described in relation to the embodiment described above, and may be modified, added, and deleted in various ways without departing from the scope and spirits of the present invention. In addition, the programmable logic controller described in relation to the embodiment is not limited to the configuration, the structure, the appearance, the shape, and so forth described in relation to the embodiment described above, and may be modified, added, and deleted in various ways without departing from the scope and spirits of the present invention.

In the description of the embodiment, in addition, the ladder language is used as the first predetermined language, and the intermediate language is used as the second predetermined language. However, the first predetermined language is not limited to the ladder language, and the second predetermined language is not limited to the intermediate language. The numerical values used in the description of the embodiment are exemplary, and the present invention is not limited to such values. In the description of the embodiment, in addition, an inverse conversion program is generated from the first intermediate code, and the first intermediate code is stored in the first ROM. However, an inverse conversion program may be generated from the second intermediate code, and the second intermediate code may be stored in the second ROM.

What is claimed is:

1. A programming assist device for a programmable logic controller program, comprising:
    processing circuitry programmed to:
    generate a first intermediate code written in a second predetermined language from an original program written in a first predetermined language using a first intermediate code converter;
    generate a second intermediate code written in the second predetermined language, which is different from the first intermediate code, from the original program written in the first predetermined language using a second intermediate code converter that is different from the first intermediate code converter;
    generate an inverse conversion program written in the first predetermined language obtained through an inverse conversion from the first intermediate code using an inverse converter;
    generate a reconverted first intermediate code written in the second predetermined language from the inverse conversion program using the first intermediate code converter;
    generate a reconverted second intermediate code written in the second predetermined language, which is different from the reconverted first intermediate code, from the inverse conversion program using the second intermediate code converter;
    compare the first intermediate code and the reconverted first intermediate code with each other or compare the second intermediate code and the reconverted second intermediate code with each other;
    generate a first executable file that is executable by a programmable logic controller from the reconverted first intermediate code using a first executable file converter in a case where the first intermediate code and the reconverted first intermediate code match each other or the second intermediate code and the reconverted second intermediate code match each other;

generate a second executable file that is executable by the programmable logic controller, which is different from the first executable file, from the reconverted second intermediate code using a second executable file converter that is different from the first executable file converter in the case where the first intermediate code and the reconverted first intermediate code match each other or the second intermediate code and the reconverted second intermediate code match each other;

transfer the first executable file to a first control device to store the first executable file in a first storage device, the first control device and the first storage device of the programmable logic controller that includes redundant control devices and storage devices composed of the first control device and the first storage device and a second control device and a second storage device; and transfer the second executable file to the second control device to store the second executable file in the second storage device.

2. The programming assist device for a programmable logic controller program according to claim 1, wherein the processing circuitry is further configured to:

compare the first intermediate code and the reconverted first intermediate code with each other and compare the second intermediate code and the reconverted second intermediate code with each other;

generate the first executable file from the reconverted first intermediate code using the first executable file converter in a case where the first intermediate code and the reconverted first intermediate code match each other and the second intermediate code and the reconverted second intermediate code match each other; and generate the second executable file, which is different from the first executable file, from the reconverted second intermediate code using the second executable file converter in the case where the first intermediate code and the reconverted first intermediate code match each other and the second intermediate code and the reconverted second intermediate code match each other.

3. The programming assist device for a programmable logic controller program according to claim 1, wherein the processing circuitry is further configured to transfer the first intermediate code to the first control device to store the first intermediate code in the first storage device.

4. The programming assist device for a programmable logic controller program according to claim 2, wherein the processing circuitry is further configured to transfer the first intermediate code to the first control device to store the first intermediate code in the first storage device.

5. The programming assist device for a programmable logic controller program according to claim 1, wherein:

the first predetermined language is a ladder language, the second predetermined language is an intermediate language, the intermediate language is a language obtained by converting the ladder language into a text format, and a same intermediate language is applicable to different types of control device that execute the first and second executable files.

6. The programming assist device for a programmable logic controller program according to claim 2, wherein:

the first predetermined language is a ladder language, the second predetermined language is an intermediate language, the intermediate language is a language obtained by converting the ladder language into a text format, and a same intermediate language is applicable to different types of control device that execute the first and second executable files.

7. The programming assist device for a programmable logic controller program according to claim 3, wherein:

the first predetermined language is a ladder language, the second predetermined language is an intermediate language, the intermediate language is a language obtained by converting the ladder language into a text format, and a same intermediate language is applicable to different types of control device that execute the first and second executable files.

8. The programming assist device for a programmable logic controller program according to claim 4, wherein:

the first predetermined language is a ladder language, the second predetermined language is an intermediate language, the intermediate language is a language obtained by converting the ladder language into a text format, and a same intermediate language is applicable to different types of control device that execute the first and second executable files.

9. A programming assist method for a programmable logic controller program, the method comprising:

generating a first intermediate code written in a second predetermined language from an original program written in a first predetermined language using the first intermediate code converter;

generating a second intermediate code written in the second predetermined language, which is different from the first intermediate code, from the original program written in the first predetermined language using a second intermediate code converter that is different from the first intermediate code converter;

generating an inverse conversion program written in the first predetermined language obtained through an inverse conversion from the first intermediate code using an inverse converter;

generating a reconverted first intermediate code written in the second predetermined language from the inverse conversion program using the first intermediate code converter;

generating a reconverted second intermediate code written in the second predetermined language, which is different from the reconverted first intermediate code, from the inverse conversion program using the second intermediate code converter;

comparing the first intermediate code and the reconverted first intermediate code with each other or comparing the second intermediate code and the reconverted second intermediate code with each other;

generating a first executable file that is executable by a programmable logic controller from the reconverted first intermediate code using a first executable file converter in a case where the first intermediate code and the reconverted first intermediate code match each other or the second intermediate code and the reconverted second intermediate code match each other;

generating a second executable file that is executable by the programmable logic controller, which is different from the first executable file, from the reconverted second intermediate code using a second executable file converter that is different from the first executable file converter in the case where the first intermediate code and the reconverted first intermediate code match each other or the second intermediate code and the reconverted second intermediate code match each other; and transferring the first executable file to a first control device to store the first executable file in a first storage device, the first control device and the first storage device of the programmable logic controller that includes redundant control devices and storage devices composed of the first control device and the first storage device and a second control device and a second storage device; and transferring the second executable file to the second control device to store the second executable file in the second storage device.

\* \* \* \* \*